United States Patent
Kondoh et al.

(10) Patent No.: US 11,182,944 B1
(45) Date of Patent: Nov. 23, 2021

(54) ANIMATION PRODUCTION SYSTEM

(71) Applicant: AniCast RM Inc., Minato-ku (JP)

(72) Inventors: Yoshihito Kondoh, Chuo-ku (JP);
Masato Murohashi, Tokyo (JP)

(73) Assignee: AniCast RM Inc., Minato-ku (JP)

( * ) Notice: Subject to any disclaimer, the term of this patent is extended or adjusted under 35 U.S.C. 154(b) by 0 days.

(21) Appl. No.: 17/008,387

(22) Filed: Aug. 31, 2020

(30) Foreign Application Priority Data

Jul. 29, 2020 (JP) .............................. JP2020-128309

(51) Int. Cl.
*G06T 19/20* (2011.01)
*G06T 13/20* (2011.01)
*G02B 27/01* (2006.01)
*G06T 19/00* (2011.01)

(52) U.S. Cl.
CPC .......... *G06T 13/20* (2013.01); *G02B 27/0172* (2013.01); *G06T 19/006* (2013.01); *G06T 19/20* (2013.01); *G06T 2213/08* (2013.01)

(58) Field of Classification Search
None
See application file for complete search history.

(56) References Cited

U.S. PATENT DOCUMENTS 9,122,321 B2 * 9/2015 Perez ................... G02B 27/017
2013/0249947 A1 * 9/2013 Reitan ..................... G06F 3/011
345/633

FOREIGN PATENT DOCUMENTS

JP    2017146651 A    8/2017

OTHER PUBLICATIONS

Mendes et al. ,A Survey on 3D Virtual Object Manipulation: From the Desktop to Immersive Virtual Environments, Dec. 2018, vol. 38, pp. 21-45 (Year: 2018).*
Kato et al., Virtual Object Manipulation on a Table-Top AR Environment, Dec. 2000, IEEE, 111-119 (Year: 2000).*

* cited by examiner

*Primary Examiner* — Robert J Craddock (57) ABSTRACT

To take animations in a virtual space, an animation production method comprising: a step of placing a virtual camera in a virtual space; a step of placing one or more objects in the virtual space; a user input detection unit that detects an input of a user from at least one of a head mounted display and a controller which the user mounted; a step of accepting at least one choice of the object in response to the input; and a step of removing the object from the virtual space in response to the input.

2 Claims, 7 Drawing Sheets

ANIMATION PRODUCTION SYSTEM

TECHNICAL FIELD

The present invention relates to an animation production system.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

No attempt was made to capture animations in the virtual space.

The present invention has been made in view of such a background, and is intended to provide a technology capable of capturing animations in a virtual space.

Solution to Problem

The principal invention for solving the above-described problem is an animation production method comprising: placing a virtual camera in a virtual space; placing one or more objects in the virtual space; a user input detector for detecting the user input from at least one of a head mount display and a controller mounted by a user; receiving at least one choice of the object in response to the input; and removing the object from the virtual space in response to the input.

The other problems disclosed in the present application and the method for solving them are clarified in the sections and drawings of the embodiments of the invention.

Advantageous Effects of Invention

According to the present invention, animations can be captured in a virtual space.

DESCRIPTION OF EMBODIMENTS

The contents of embodiments of the present invention will be described with reference. The present invention includes, for example, the following configurations.

[Item 1]
An animation production method comprising:
a step of placing a virtual camera in a virtual space;
a step of placing one or more objects in the virtual space;
a user input detection unit that detects an input of a user from at least one of a head mounted display and a controller which the user mounted;
a step of accepting at least one choice of the object in response to the input; and
a step of removing the object from the virtual space in response to the input.

[Item 2]
The animation production method according to item 1, the method further comprising
a step of displaying in the virtual space a list of the objects disposed in the virtual space,
wherein the step of accepting the choice includes accepting the choice of at least one of the object from the list in response to the input.

[Item 3]
The animation production method according to item 1, the method further comprising
a step of accepting a designation of the object to be locked,
wherein the step of accepting the choice includes making the locked object selectable.

A specific example of an animation production system 300 according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

<Overview>

Figure 1:
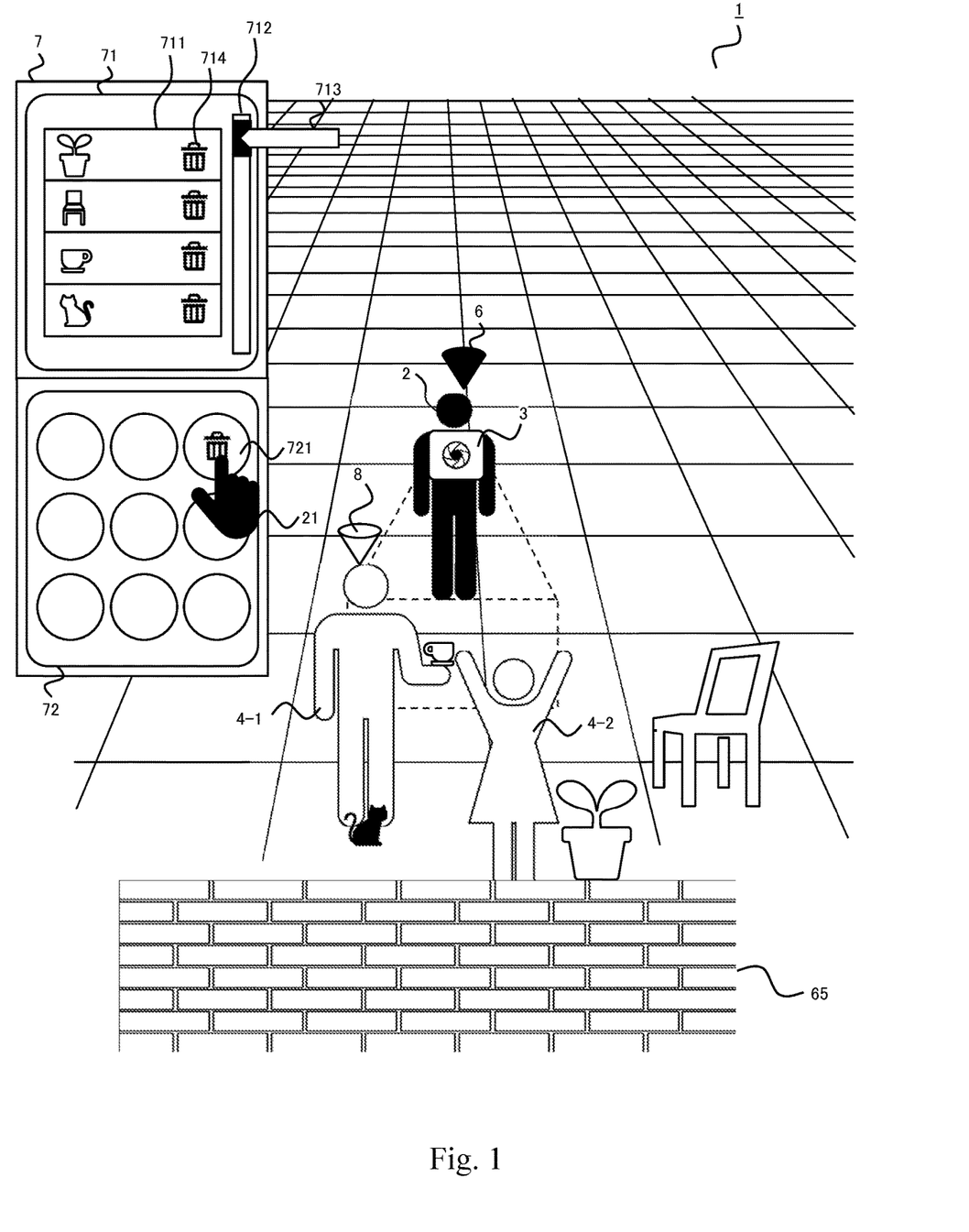
FIG. 1 is a diagram illustrating an example of a virtual space displayed on a head mount display (HMD) mounted by a user in an animation production system 300 of the present embodiment.

FIG. 1 is a diagram illustrating an example of a virtual space displayed on a head mount display (HMD) mounted by a user in an animation production system 300 according to the present embodiment. The animation production system 300 according to the present exemplary embodiment is intended to create an animation by placing a virtual character 4 and a virtual camera 3 in a virtual space 1 and taking a character 4 using a camera 3.

A photographer 2 (a photographer character) is disposed in the virtual space 1, and the camera 3 is virtually operated by the photographer 2. In the animation production system 300 of this embodiment, as shown in FIG. 1, the user arranges the character 4 and the camera 3 while viewing the virtual space 1 from a bird's eye (Third Person's View), shoots the character 4 using the FPV (First Person View) as the photographer 2, and performs the performance of the character 4 using the FPV, while producing the animation. A plurality of characters 4 (in the example of FIG. 1, characters 4-1 and 4-2) can be disposed within the virtual space 1, and the user can perform the performance while possessing the selected character 4 (setting the operation target). When a plurality of characters 4 are disposed, the user can switch the possessed object (the object to be operated) to one of the characters 4 (e.g., characters 4-1 and 4-2).

In this manner, in the animation production system 300 of the present embodiment, one can play a number of roles (roles). In addition, since the camera 2 can be virtually operated as the photographer 2, natural camera work can be realized and the representation of the movie to be shot can be enriched.

<General Configuration>

Figure 2:
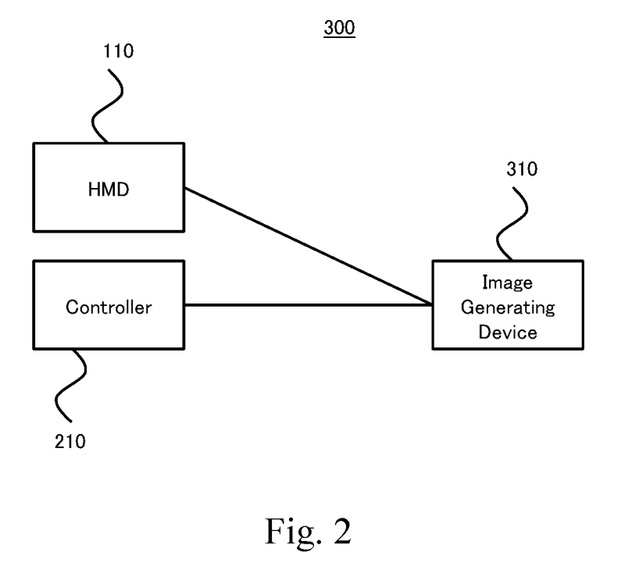
FIG. 2 is a diagram illustrating an example of the overall configuration of an animation production system 300 according to an embodiment of the present invention.

FIG. 2 is a diagram illustrating an example of the overall configuration of an animation production system 300 according to an embodiment of the present invention. The animation production system 300 may comprise, for example, an HMD 110, a controller 210, and an image generating device 310 that functions as a host computer. An infrared camera (not shown) or the like can also be added to the animation production system 300 for detecting the position, orientation and slope of the HMD 110 or controller 210. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The image generating device 310 may be a PC, a game machine, a portable communication terminal, or any other device having a calculation processing function.

<HMD 110>

Figure 3:
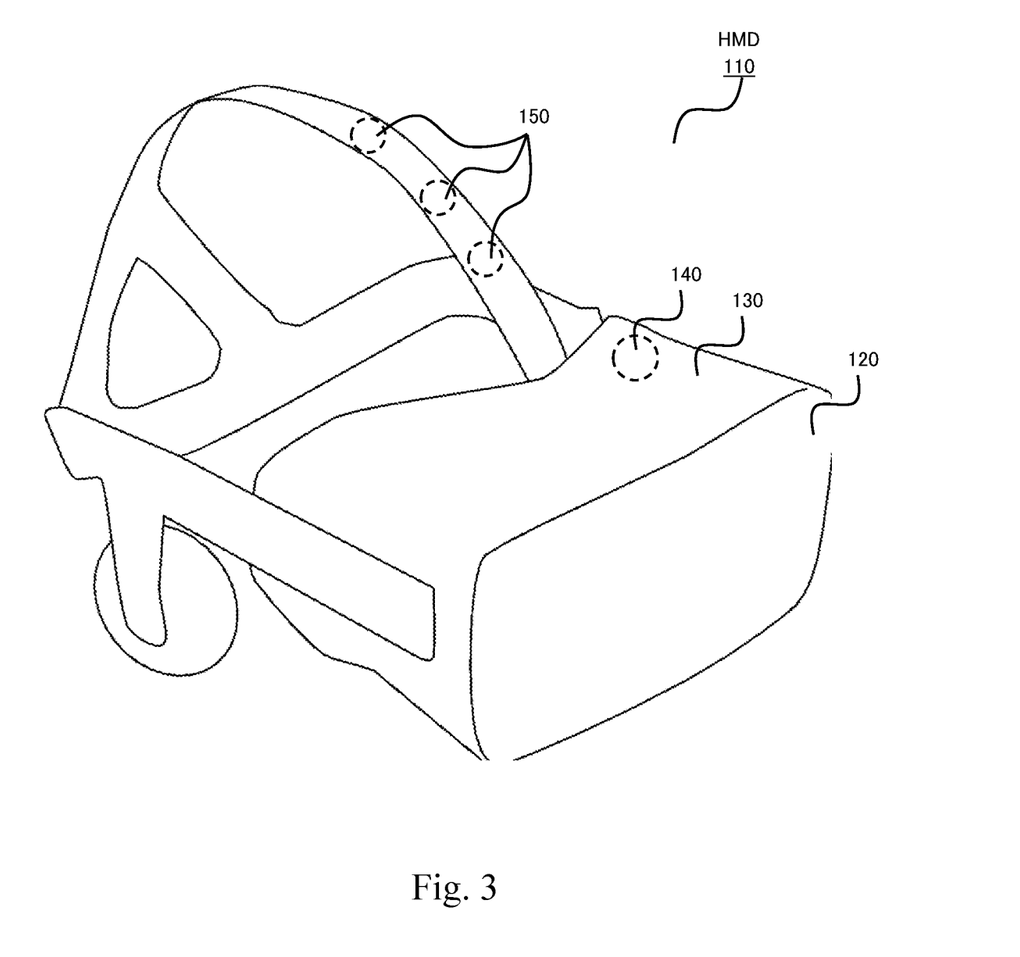
FIG. 3 is a diagram schematically illustrating the appearance of the HMD 110 according to the present embodiment.
Figure 4:
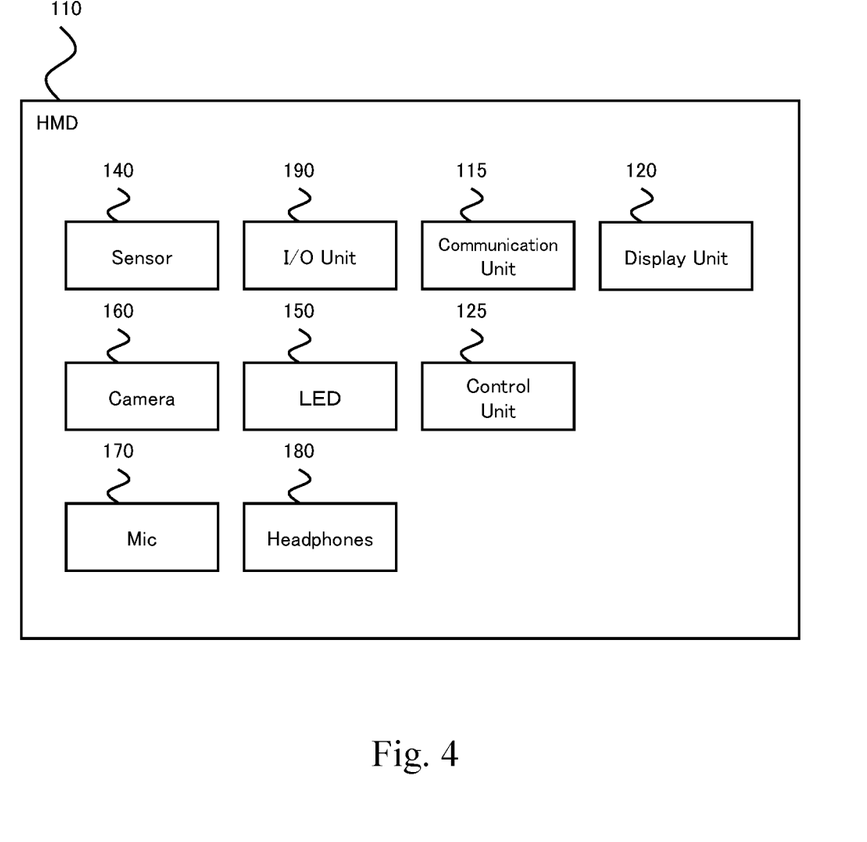
FIG. 4 is a diagram illustrating an example of a functional configuration of the HMD 110 according to the present embodiment.

FIG. 3 is a diagram schematically illustrating the appearance of the HMD 110 according to the present embodiment. FIG. 4 is a diagram illustrating an example of a functional configuration of the HMD 110 according to the present embodiment.

The HMD 110 is mounted on the user's head and includes a display panel 120 for placement in front of the user's left and right eyes. Although the display panel 120 may be an optically transmissive or non-transmissive display, the present embodiment illustrates a non-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. Sensor 140 may comprise, for example, a magnetic sensor, an acceleration sensor, or a gyro sensor, or a combination thereof, to detect movements such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

<Controller 210>

Figure 5:
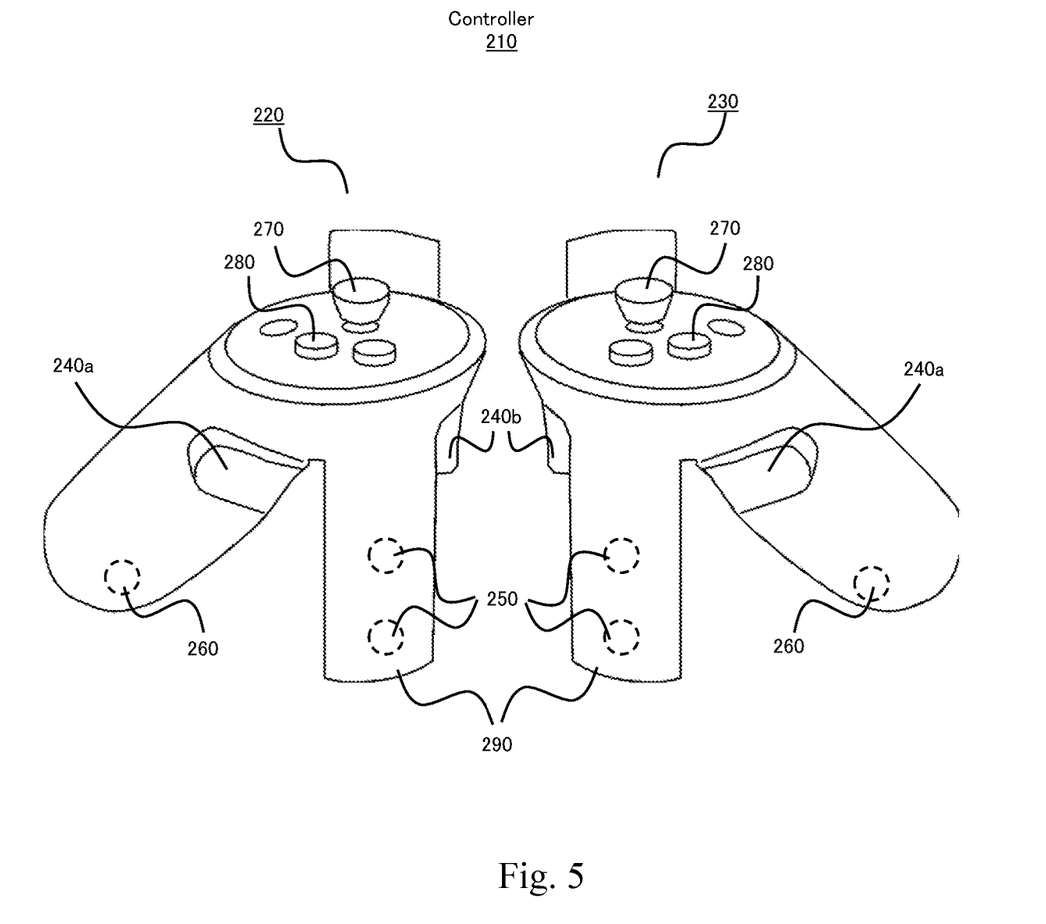
FIG. 5 is a diagram schematically illustrating the appearance of the controller 210 according to the present embodiment.
Figure 6:
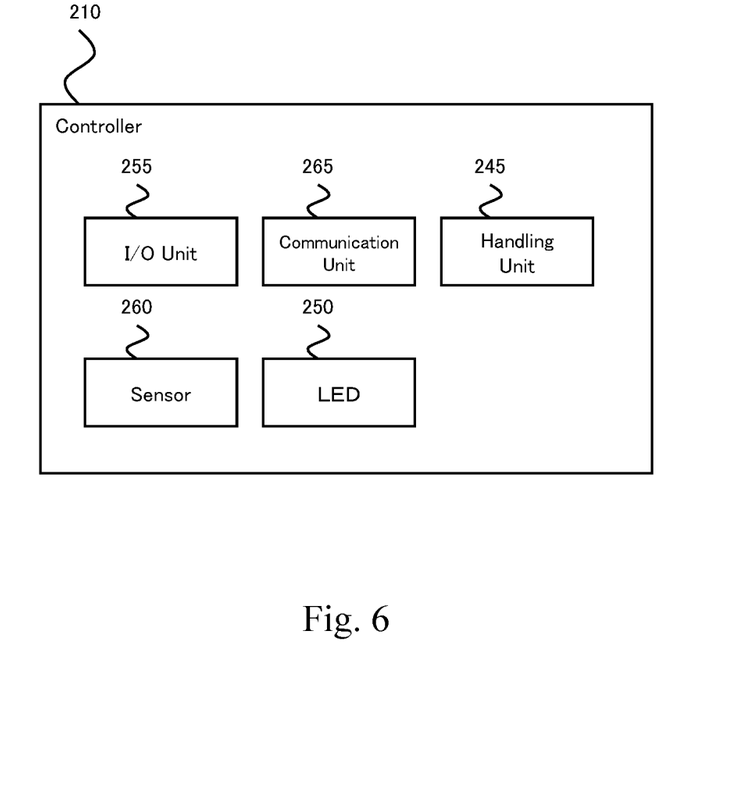
FIG. 6 is a diagram illustrating an example of a functional configuration of a controller 210 according to the present embodiment.

FIG. 5 is a diagram schematically illustrating the appearance of the controller 210 according to the present embodiment. FIG. 6 is a diagram illustrating an example of a functional configuration of a controller 210 according to this embodiment.

The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240a, 240b in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect movements such as the orientation and tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the movement and attitude of the user's hand, pseudo-displaying and operating the user's hand in the virtual space.

<Image Generator 310>

Figure 7:
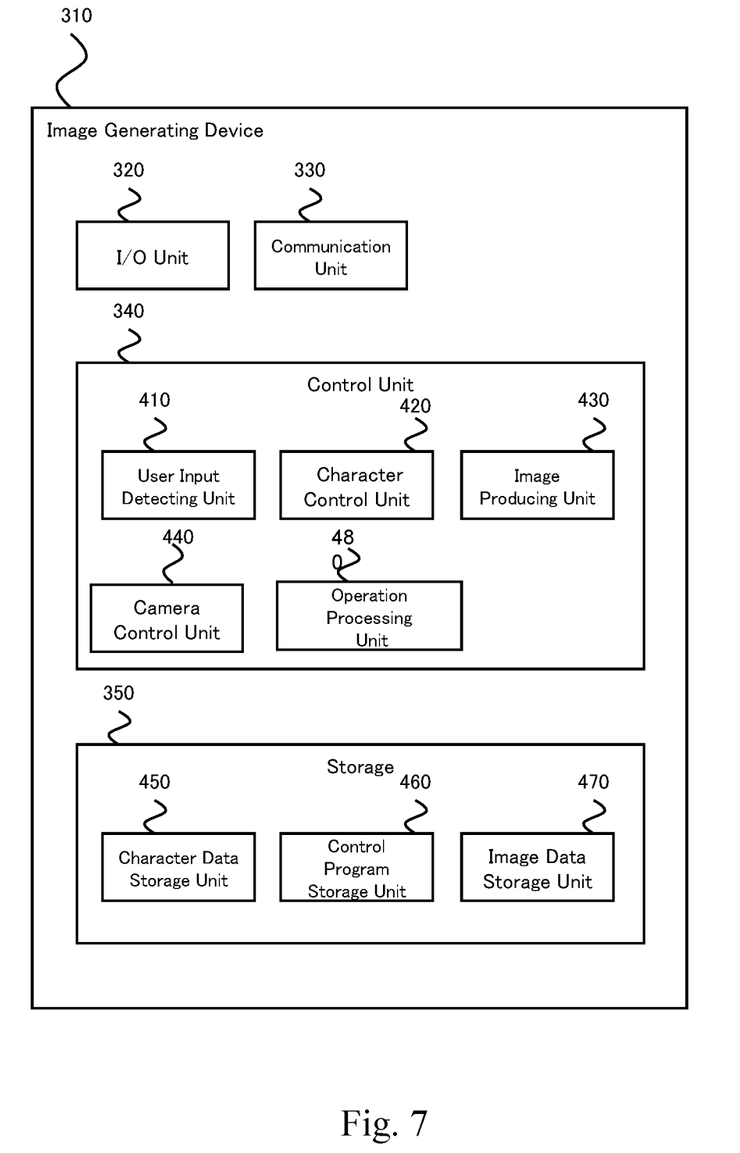
FIG. 7 is a diagram illustrating a functional configuration of an image producing device 310 according to the present embodiment.

FIG. 7 is a diagram illustrating a functional configuration of an image producing device 310 according to the present embodiment. The image producing device 310 may use a device such as a PC, a game machine, a portable communication terminal, or the like, which has a function for storing information on the user's head movement or the movement or operation of the controller acquired by the user input information or the sensor, which is transmitted from the HMD 110 or the controller 210, performing a predetermined computational processing, and generating an image. The image producing device 310 may include an input/output unit 320 for establishing a wired connection with a peripheral device such as, for example, an HMD 110 or a controller 210, and a communication unit 330 for establishing a wireless connection such as infrared, Bluetooth, or WiFi (registered trademark). The information received from the HMD 110 and/or the controller 210 regarding the movement of the user's head or the movement or operation of the controller is detected in the control unit 340 as input content including the operation of the user's position, line of sight, attitude, speech, operation, etc. through the I/O unit 320 and/or the communication unit 330, and a control program stored in the storage unit 350 is executed in accordance with the user's input content to perform a process such as controlling the character 4 and generating an image. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input detecting unit 410 that detects information received from the HMD 110 and/or the controller 210 regarding the movement of the user's head and the movement or operation of the controller, a character control unit 420 that executes a control program stored in the control program storage unit 460 for the character data storage unit 450 of the storage unit 350, a camera control unit 440 that controls the virtual camera 3 disposed in the virtual space 1 according to the character control, an operation processing unit 480 that performs the operation of a user in the virtual space 1, and an image producing unit 430 that generates an image in which the camera 3 captures the virtual space 1 based on the character control. Here, the movement of the character 4 or the camera man 2 is controlled by converting information such as the direction, inclination, and hand movement of the user head detected through the HMD 110 or the controller 210 into the movement of each part of the bone structure created in accordance with the movement or restriction of the joints of the human body, and applying the bone structure movement to the previously stored character data. The control of the camera 3 is performed, for example, by changing various settings (e.g., the position within the virtual space 1 of the camera 3, the shooting direction, the focus position, and the zoom of the camera 3) with respect to the camera 3 according to the movement of the character 4 by hand.

The storage unit 350 stores in the aforementioned character data storage unit 450 information related to the character 4, such as the attribute of the character 4, as well as the image data of the character 4. The control program storage unit 460 controls the operation and expression of the character 4 in the virtual space and stores a program for controlling an object such as the camera 3. The image data storage unit 470 stores the image generated by the image producing unit 430. In this embodiment, the image stored in the image data storage unit 470 can be an action data for generating a moving image. The action data may include, for example, 3D data for displaying the character 4 in the virtual space 1, pause data for identifying the bone structure of the 3D data, motion data for identifying the movement of the bone structure, and the like. In addition, the image producing unit 430 may create (render) a moving image based on the action data and register the video data as a result of rendering in the image data storage unit 470.

As illustrated in FIG. 1, the operation processing unit 480 displays the operation panel 7 in the virtual space 1, and can activate various functions in the virtual space 1 according to operation of the operation panel 7, for example, the fingers 21. The operation panel 7 may appear in the virtual space 1, for example, when a button of the controller 210 is pressed or when a predetermined operation is performed by the controller 210. The operation panel 7 may be freely disposed in the virtual space 1 by operation of the user, but may be moved in the vicinity of a user's hand or finger 21, etc. in the virtual space 1, for example, if any button of the controller 210 is pressed or if predetermined operation is performed by the controller 210. In this case, the operation panel 7 is a viewing field of view of the user (in the case of FIG. 1, a viewing field of view of the user, for example, if the user is operating the character 4), and is visible to the user, for example, the object can be moved to a space in which the object is placed on the user's viewing line of view.

The operation panel 7 may include a display unit 71 and an indication unit 72. Various types of information can be displayed on the display unit 71.

For example, a button 721 may be disposed in the indicator portion 72 of the operation panel 7. Pressing button 721 can invoke various functions necessary for performing character 4 or taking pictures with camera 3. For example, as shown in FIG. 1, when a button 721 is pressed, a list 711 of objects disposed in the virtual space 1 can be displayed on the display unit 71. In addition, any function can be assigned to the button provided by the indicating unit 72, such as, for example, a function to call an asset panel (not shown) that displays a list of newly arranged assets (objects), a function to display an image of the camera 3 on the display unit 71, or a function to display a view field from the character 4 on the display unit 71.

For example, in the case where a large number of objects are disposed in the virtual space 1, when there is a large amount of information displayed on the display unit 71, the display unit 71 may include a scroll bar 712. Although the user may operate the scroll bar 712 using a finger 21 or the like, in this embodiment, a lever 713 for manipulating the scroll bar 712 is provided in the display 71. The user may use a finger 21 or the like to grab and slide the lever 713 and scroll the display 71 according to the slide of the lever 713. Rather than manipulating a planar controller, such as a scroll bar, that is displayed in a typical operating system windowing system, objects (levers 713, etc.) in virtual space 1 that are gripped by a hand can be manipulated to improve operability. In other words, a variety of three-dimensional controllers may be employed, not limited to the lever 713. For example, the display unit 71 may be provided with a knob used for the volume control of the mixer device, and the display unit 71 may be scrolled by rotating the knob. The sliding direction of the lever 713 is up and down in the example of FIG. 1, but can be set to slide in any direction, such as a horizontal direction or a depth direction.

A list 711 of objects in the virtual space 1 is displayed in the display unit 71, and a delete icon 714 is distributed to each item. If the user selects the deletion icon 714 by a finger 21 or the like, the object pertaining to the item can be deleted from the virtual space 1. It is also possible to delete the object corresponding to the selected item by selecting the item in the list 711 and pressing the deletion button 721 of the indication unit 72.

In addition, in the virtual space 1, a user selects an object by a finger 21 or the like (in the example of FIG. 1, the object shown by the cone 8 can be shown to be selected), and the selected object may be deleted in response to a depression such as a deletion icon 714 of the display unit 71 or a button 721 of the indication unit 72. It is also possible to display a deletion mark near a selected object (e.g., a character 4-1 shown in FIG. 1 in which a cone 8 is illustrated), such as a vicinity of a cone 8, and to delete the selected object by selecting the deletion mark with a finger 21 or the like.

When deleting an object from virtual space 1, the object to be locked may be specified. For example, in FIG. 1, the background image data 65 (a plate polygon having an image attached as a texture, etc.) can be locked as a deletion target without being selected. In this case, the list 711 of the display unit 711 may not display the locked object, or the item corresponding to the locked object may not display the delete icon 714, or may be rendered unusable.

For example, the object to be locked (e.g., the image data 65) is selected from the list 711 displayed in the display unit 71, and the selected object is locked. When the object to be deleted is specified in the virtual space 1, the locked object can not be selected by a finger 21 or the like in the virtual space 1. It should be noted that the object lock can be used not only for deletion but also for the entire work time in the virtual space 1. For example, when the background image data 65 is locked in the virtual space 1 to select a character 4 or other object disposed near the background, it is possible to prevent the background from being moved by mistake.

As described above, according to the animation production system 300 of the present exemplary embodiment, a user can operate the camera 3 as the camera man 2 in the virtual space 1 to take video images. Accordingly, since the camera 3 can be operated in the same way as in the real world to take photographs, it is possible to realize a natural camera work and to provide a richer representation of the animated video.

Further, according to the animation production system 300 of the present embodiment, the character 4 can be performed sequentially while switching the character 4 to be possessed in the virtual space 1. Thus, animation can be efficiently captured.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, the image generating device 310 may be a single computer, but not limited to the HMD 110 or the controller 210 may be provided with all or some of the functions of the image generating device 310. It may also include a function of a portion of the image generating device 310 to other computers that are communicatively connected with the image generating device 310.

In the present exemplary embodiment, a virtual space based on the virtual reality (VR; Virtual Reality) was assumed. However, the animation production system 300 of the present exemplary embodiment is not limited to an extended reality (AR; Augmented Reality) space or a complex reality (MR; Mixed Reality) space, but the animation production system 300 of the present exemplary embodiment is still applicable.

In the present embodiment, the second choice is whether the operation mode is a bird's-eye mode or not (S603). However, the rendering mode for creating the final animated image based on the action data may be provided.

EXPLANATION OF SYMBOLS

1 virtual space
2 cameraman
3 cameras
4 characters
110 HMD
120 display panel
130 housing
140 sensor
150 light source
210 controller
220 left hand controller
230 right hand controller
235 grip
240 trigger button
250 Infrared LED
260 sensor
270 joystick
280 menu button
300 Animation Production System
310 Image Generator
320 I/O portion
330 communication section
340 controller
350 storage
410 User Input Detector
420 character control unit
430 Image Generator
440 Camera Control
450 character data storage section
460 Program Storage
470 Image Data Storage
480 Operation Processing Block
510 handle
520 display
530 rail
540 slider
550 recording button

The invention claimed is:
1. An animation production method comprising:
a step of placing a virtual camera in a virtual space;
a step of placing one or more objects in the virtual space;
a step of detecting an input of a user from at least one of a head mounted display and a controller which the user mounted;
a step of displaying a list of the objects disposed in the virtual space, the list displayed on an operation panel disposed in the virtual space;
a step of accepting at least one choice of the object from the list on the operation panel in response to the input; and
a step of removing the object from the virtual space in response to the input.
2. The animation production method according to claim 1, the method further comprising
a step of accepting a designation of the object to be locked, wherein the step of accepting the choice includes making the locked object selectable.

\* \* \* \* \*